United States Patent [19]

Madkour

[11] Patent Number: 4,796,751

[45] Date of Patent: Jan. 10, 1989

[54] PORTABLE EYEGLASS CLEANING DEVICE

[76] Inventor: Catherine M. Madkour, 7117 Fort Hamilton Pkwy., Brooklyn, N.Y. 11228

[21] Appl. No.: 174,191

[22] Filed: Mar. 28, 1988

[51] Int. Cl.$^4$ .............................................. B65D 81/22
[52] U.S. Cl. .................... 206/223; 206/205; 206/494; 206/812
[58] Field of Search ................... 15/104, 105, 114; 134/115 R; 206/223, 204, 205, 207, 209, 210, 229, 233, 361, 494, 812

[56] References Cited

U.S. PATENT DOCUMENTS

| | | | |
|---|---|---|---|
| 3,240,326 | 3/1966 | Miller | 206/361 |
| 3,561,456 | 2/1971 | Stuart | 206/812 |
| 3,563,371 | 2/1971 | Heinz | 206/361 |
| 3,881,210 | 5/1975 | Drach et al. | 206/812 |
| 3,921,802 | 11/1975 | Thompson | 206/229 |
| 4,290,522 | 9/1981 | Takahashi | 206/233 |
| 4,332,319 | 6/1982 | Hurwood | 206/812 |
| 4,420,080 | 12/1983 | Nakamura | 206/494 |

FOREIGN PATENT DOCUMENTS

| | | | |
|---|---|---|---|
| 2324997 | 12/1974 | Fed. Rep. of Germany | 206/205 |
| 2724305 | 12/1978 | Fed. Rep. of Germany | 206/210 |
| 2914590 | 10/1980 | Fed. Rep. of Germany | 206/812 |

*Primary Examiner*—Jimmy G. Foster
*Attorney, Agent, or Firm*—Kuhn and Muller

[57] ABSTRACT

A portable kit for cleaning eyeglass lenses which includes a flat, flexible container with two separate openable air-tight compartments, one of the compartments containing a liquid eyeglass lens cleaner absorbed on an absorbent material, and the second compartment containing a dry wiping material which is capable of wiping lenses cleaned by the lens cleaning material without being deteriorated and without harming the eyeglass lens.

12 Claims, 2 Drawing Sheets

PORTABLE EYEGLASS CLEANING DEVICE

FIELD OF THE INVENTION

This invention relates to a product useful for cleaning eyeglass lenses, and more particularly, to a package which provides both an eyeglass lens cleaning medium and an eyeglass lens wiping medium.

BACKGROUND OF THE INVENTION

As is well known, it is desirable or even necessary to frequently clean the lenses of eyeglasses. Due to the wide range activities in which an individual who wears eyeglasses may be involved and the extent to which the use of eyeglasses are required means for conventional sources of cleaning such lenses are in general, not readily available. Many of such situations would be apparent, e.g., when traveling in automobiles or other means of private transportation, when engaged in sporting or other outdoor activities, when shopping and the like.

Heretofore, a variety of methods and products have been used to clean eyeglass lenses including commonly available tissues, textile products or the like wiping medium generally available in dispenser packages and used with water or similar liquids chemically "treated" tissues, various "special" cleaning liquids or compounds contained in bottles, jars, etc. which are applied or used in conjunction with tissues and the like. Such suitable cleaning devices are generally not readily available during many situations the eyeglass wearer may be pursuing and the materials which are available do not adequately clean the eyeglass lens or may actually be detrimental to the surface of the lens. The variety of materials from which eyeglass lenses are currently prepared such as plastic, coated plastic, hardened glass, coated glass etc. make it evident that special care must be used in the choice materials that will adequately clean the eyeglass lens while preventing the same from being damaged.

Several portable cleaning devices for use in cleaning an individuals hands face or other parts or the anatomy are known or have been suggested. However, such cleaning devices are usually only adapted to a single function and comprise liquid chemical solutions absorbed on absorbent materials which are used to wipe the hands, face of the like to clean the same, and rely on evaporation or air drying of the chemical washing solution. In general, such chemical washing solutions may leave a film of dirt or chemical on the treated surface or the chemical materials used may be detrimental to the lens. Separate drying or wiping medium may be employed to remove the film from the treated surface but, as indicated, such separate wiping media may not be readily available or may also be detrimental to the lens.

Other portable cleaning or treating devices are known or have been suggested which include particular combinations of cleaning and treating ingredients in a unitary package but such devices comprise particular combinations of chemical ingredients which are directed to both clean and treat surfaces of the anatomy and, thus, do not provide the features required for use in maintaining eyeglass lenses such as by first thoroughly cleaning soil from an eyeglass lens surface and then wiping the surface free of ingredients which may be detrimental to viewing through the lens.

SUMMARY OF THE INVENTION

It is therefore an object of the present invention to provide a portable cleaning device for eyeglass lenses which make readily available both cleaning and wiping media suitable for use with eyeglass lenses.

Another object of the present invention is to provide a unitary portable cleaning device for eyeglass lenses containing both cleaning and wiping media suitable for use with eyeglass lenses.

Still another object of the present invention is to provide a unitary portable cleaning device suitable for use with eyeglass lenses which is readily usable after being carried by an eyeglass wearer engaged in a variety of activities.

A further object of the present invention is to provide a unitary portable cleaning device suitable for use with eyeglass lenses where a cleaning media and a wiping media are separably maintained and separably available.

In accordance with the present invention there is provided a portable kit suitable for use in cleaning eyeglass lenses which includes both a lens cleaning media and a lens wiping media. The kit comprises a generally flat, flexible container having two separate compartments which are separably openable to make separably available the lens cleaning media and the lens wiping media. The lens cleaning media and wiping media are suitable for use generally to effectively clean a variety of eyeglass lenses when the eyeglass wearer is participating in activities remote from conventional eyeglass cleaning means. The product of the invention can be readily used and then can be disposed of.

In a further aspect of the invention the portable kit suitable for use in cleaning eyeglass lenses which would be usable after being stored in a variety of locatins and/or being carried by an eyeglass wearer while engaging in outdoor activities.

Other advantages of the invention will become apparent from the following detailed description taken in conjunction wih the accompanying drawings.

DESCRIPTION OF THE PREFERRED EMBODIMENTS

Figure 1:
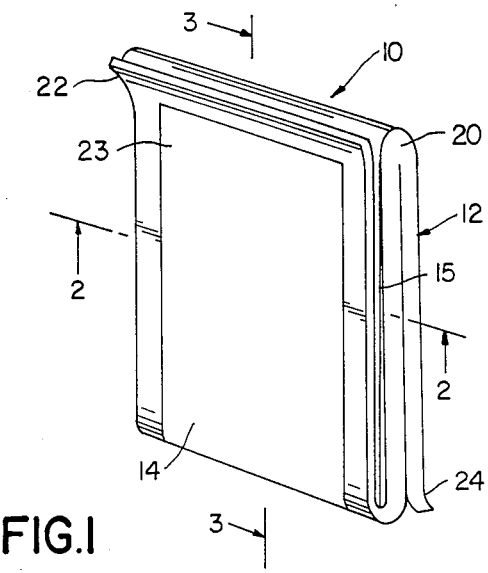
FIG. 1 is a perspective view of a portable eyeglass cleaning device according to the invention.
Figure 2:
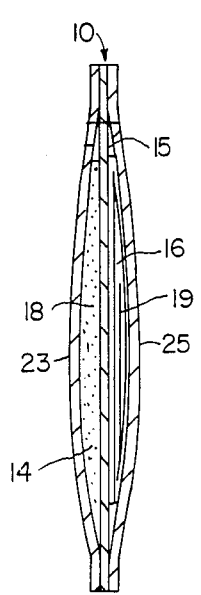
FIG. 2 is an sectional view taken along line 2—2 in FIG. 1.
Figure 3:
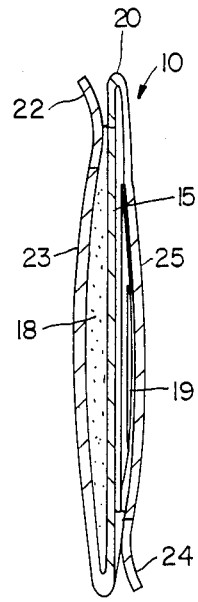
FIG. 3 is a sectional view taken along line 3—3 in FIG. 1.

Referring now to the drawings, there is shown in FIGS. 1-3 an eyeglass lens cleaner kit 10 in accordance with the invention which comprises an outer liquid and gas impervious openable packet or container 12 including two compartments 14 and 16. Compartment 14 contains a removable moistened absorbent cleaning material 18 such as woven or unwoven fabric, thin, tough liquid absorbent paper or any absorbent material which will not deteriorate structurally or chemically when moistened with a liquid eyeglass lens cleaner or during use an an applicator, is soft enough not to scratch the eyeglass lens and will not drain in the package.

The cleaning liquid employed may be any suitable liquid compound not harmful to the eyeglass lens, human skin, eyes or the like, and, for example, may be the mixture of alcohol, water, surfactant, silicone fluid water repellant, cleansing agent and the like.

Compartment 16 contains a removable thin sheet of dry wiping material 19 formed of woven or unwoven textile fabric, thin tough liquid absorbent paper or any absorbent fibrous material which will not deteriorate structurally or chemically during use as a wiper for the eyeglass lens and is soft enough not to scratch the eyeglass lens during wiping.

The packet or container 12 is made of a moisture and gas impervious sheet material, such as metal foil, treated paper or plastic film, which is openable by tearing along a scored or creased "tear-open" line or by separation of the sealed edges. Preferably, the compartments 14 and 16 are formed from one strip of material 20 with the opposing ends 22 and 24, folded to overlie opposite sides of an essentially medial section of the strip, thus, requiring sealing or joining of only the remaining three edges to form two compartments 14 and 16 with a common wall 15 between them. Compartment 14 comprises an outer wall 23 and common wall 15, while compartment 16 is formed by outer wall 25 and common wall 15. The three separable peripheral edges of all three walls 15, 23 and 25 are sealed together in an air tight manner, such as by using a suitable adhesive, by crimping or by heat sealing. Both compartments are air-tight so that the moisture carried by cleaning material 18 cannot evaporate or leak and the wiping material 19 cannot absorb moisture either from cleaning material 18 or from the atmosphere.

Figure 4:
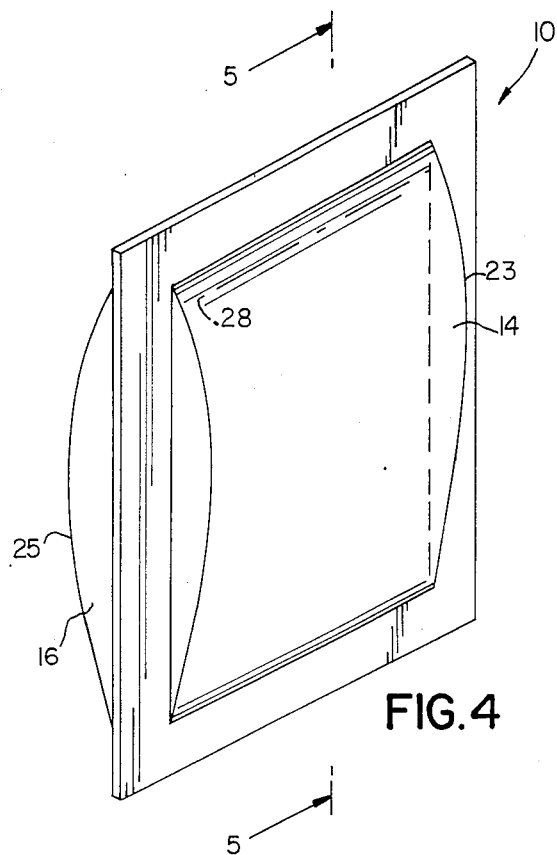
FIG. 4 is a perspective view of an alternate embodiment of the portable eyeglass cleaning device in accordance with the invention.
Figure 5:
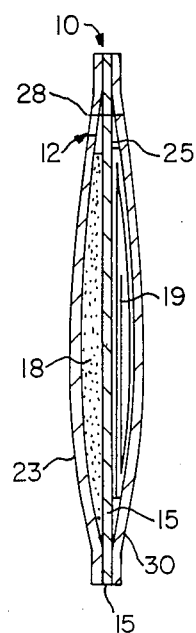
FIG. 5 is an sectional view taken along line 5—5 in FIG. 4.

In FIGS. 4-5 is illustrated an alternate embodiment of constructing the two compartment containers, the separate compartments 14, 16 being formed with a common wall 15 between them by three separate sheets of a moisture and gas impervious material arranged in an overlying relationship and the four peripheral edges being joined together. The remainder of the sheet material remain separated and form the walls of the separate compartments.

In use, the compartment 14 containing the eyeglass lens cleaning material 18 can be opened by separating or peeling back the end 22 of outer wall 23 from common wall 15 without opening or compromising the air-tight seal of compartment 16. The moist lens cleaning material is withdrawn from compartment 14 and used to clean the lenses of eyeglasses requiring such treatment. The lens cleaning material is then discarded and compartment 16 is opened by separating or peeling back the end 24 of wall 25. The wiping material is removed from compartment 16, unfolded if necessary, and used to wipe dry the eyeglass lenses first cleaned with the moist lens cleaning material.

In the packet shown in FIGS. 4 and 5, the compartment 14 is opened at one end such as by tearing along line 28 to remove the cleaning material and compartment 16 is opened at one end such as by tearing along line 30 to remove the wiping material.

Figure 6:
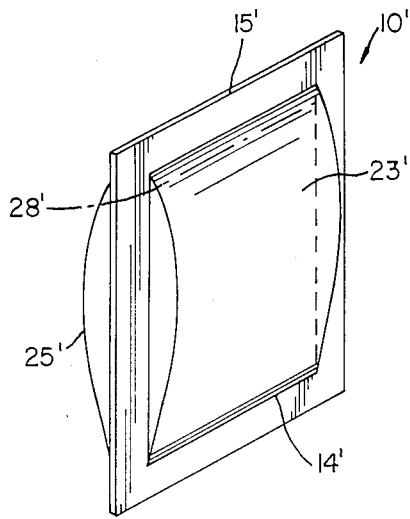
FIG. 6 is a perspective view of another alternative embodiment of the portable eyeglass cleaning device in accordance with the invention.

In FIG. 6 is shown a packet 10' which is identical to packet 10 of FIGS. 4 and 5, except the center wall 15' is made of a moisture and gas impervious sheet material which is less flexible than the materials used to make wall 23' and 25' or includes an added stiffener. This will assist in maintaining the desired configuration of the device when it is carried on the users person, pocket, pocketbook and the like.

While a three-wall compartment structure as shown in the drawings, is preferred, two separate compartments containing the lens cleaning material and the lens wiping material, respectively, could be employed with the compartments joined together along one edge with a line of perforations, scoring etc. enabling the separate packets to be readily separated if desired.

The principle, preferred embodiments and modes of use of present invention have been described in the foregoing specification the invention is not to be constured as limited to the particular forms disclosed, since these are regarded as illustrative rather than restrictive and variations and changes may be made by those skilled in the art without departing from the spirit of the invention.

What is claimed is:

1. A portable kit for cleaning eyeglass lenses which comprises:
    a flat container hvaing two separate openable compartments including a first compartment containing an eyeglass lens cleaning media capable of cleaning eyeglass lenses without deteriorating the lens and a second compartment containing an eyeglass lens wiping media capable of wiping eyeglass lenses cleaned by said lens cleaning media without affecting viewing through the lens.

2. A portable eyeglass lens cleaning kit according to claim 1, wherein said first and second compartments are air-tight when closed.

3. A portable eyeglass lens cleaning kit according to claim 2, wherein said container is made from a moisture and gas impervious sheet.

4. A portable eyeglass lens cleaning kit according to claim 2, wherein said eyeglass lens cleaning media in the first compartment includes an absorbent cleaning material moistened with a liquid eyeglass lens cleaner.

5. A portable eyeglass lens cleaning kit according to claim 4, wherein said eyeglass lens wiping media in said second compartment is a thin sheet of dry wiping material.

6. A portable eyeglass lens cleaning kit according to claim 5, wherein said first and second compartments are separably openable.

7. A portable eyeglass lens cleaning product comprising:
    a flat, flexible container having two separate air-tight openable compartments with a common wall therebetween, a first of said compartments containing a moistened absorbent eyeglass lens cleaning material capable of cleaning eyeglass lenses without deteriorating or adversely effecting the eyeglass lens, and a second of said compartments containing a dry lens wiping material capable of wiping eyeglass lenses cleaned by said lens cleaning material without affecting viewing through the lens.

8. The portable eyeglass lens cleaning product according to claim 7, wherein said container is made from one strip of a moisture and gas impervious sheet material.

9. The portable eyeglass lens cleaning product according to claim 8, wherein said separate compartments are separably openable.

10. The portable eyeglass lens cleaning product according to claim 7, wherein said lens cleaning material contains a liquid eyeglass lens cleaner.

11. The portable eyeglass lens cleaning product according to claim 7, wherein said dry lens wiping material is chemically treated with a silicone.

12. The portable eyeglass lens cleaning product according to claim 7, which includes stiffening means for said container.

* * * * *